United States Patent
Zhu et al.

(10) Patent No.: US 11,812,078 B2
(45) Date of Patent: Nov. 7, 2023

(54) JOINT RECOMMENDATION AND CACHE OPTIMIZATION METHOD BASED ON COLLABORATION OF MULTIPLE BASE STATIONS

(71) Applicant: NANJING UNIVERSITY OF POSTS AND TELECOMMUNICATIONS, Nanjing (CN)

(72) Inventors: Qi Zhu, Nanjing (CN); Xiaoqi Chen, Nanjing (CN)

(73) Assignee: NANJING UNIVERSITY OF POSTS AND TELECOMMUNICATIONS, Nanjing (CN)

(*) Notice: Subject to any disclaimer, the term of this patent is extended or adjusted under 35 U.S.C. 154(b) by 0 days.

(21) Appl. No.: 18/183,383

(22) Filed: Mar. 14, 2023

(65) Prior Publication Data
US 2023/0328303 A1    Oct. 12, 2023

Related U.S. Application Data

(63) Continuation of application No. PCT/CN2022/107290, filed on Jul. 22, 2022.

(30) Foreign Application Priority Data

Mar. 25, 2022 (CN) .......................... 202210305642.7

(51) Int. Cl.
*H04N 21/25* (2011.01)
*H04N 21/466* (2011.01)

(52) U.S. Cl.
CPC ......... *H04N 21/25* (2013.01); *H04N 21/4668* (2013.01)

(58) Field of Classification Search
CPC .......................... H04N 21/25; H04N 21/4668
See application file for complete search history.

(56) References Cited

U.S. PATENT DOCUMENTS

| | | | | |
|---|---|---|---|---|
| 2013/0298175 A1* | 11/2013 | Agrawal | ............ | H04N 21/4668 725/93 |
| 2021/0266834 A1 | 8/2021 | Hu et al. | | |

FOREIGN PATENT DOCUMENTS

| | | | | |
|---|---|---|---|---|
| CN | 106686655 A | * | 5/2017 | ......... H04L 67/1074 |
| CN | 106686655 A | | 5/2017 | |
| CN | 109936633 A | | 6/2019 | |

* cited by examiner

*Primary Examiner* — Sumaiya A Chowdhury
(74) *Attorney, Agent, or Firm* — Nitin Kaushik

(57) ABSTRACT

Disclosed is a joint recommendation and cache optimization method based on a collaboration of multiple base stations, each base station in a target area randomly caching contents stored to the cloud, when each base station in the target area receives a to-be-responded content request, constructing the recommendation optimization sub-model, the access optimization sub-model and the cache optimization sub-model, then constructing and solving the optimization problem to obtain the target base station, optimal cached contents and the recommendation list that correspond to the to-be-responded content request. Through the technical solution of the present application, the total time delay of the system is minimized, and by jointly optimizing the recommendation decision, access decision and cache decision, the delay can be significantly reduced with a lower cache capacity, and more efficient for users, good experience.

7 Claims, 5 Drawing Sheets

JOINT RECOMMENDATION AND CACHE OPTIMIZATION METHOD BASED ON COLLABORATION OF MULTIPLE BASE STATIONS

CROSS-REFERENCE TO RELATED APPLICATIONS

This application is a continuation application of International Application No. PCT/CN2022/107290, filed on Jul. 22, 2022, which claims priority to Chinese Patent Application No. 202210305642.7, filed on Mar. 25, 2022. The disclosures of the above-mentioned applications are incorporated herein by reference in their entireties.

TECHNICAL FIELD

The present application relates to the field of communication technology, and specifically to a joint recommendation and cache optimization method based on a collaboration of multiple base stations.

BACKGROUND

In recent years, with the booming mobile internet and the widespread use of mobile devices, the traffic in mobile networks is grown exponentially. However, the explosive growth of traffic in the mobile networks will increase the burden of backhaul links, to cause network congestion and seriously degrade user quality of service (QoS), which can be effectively solved by a mobile edge caching (MEC) technology. By caching some files at the edge of the network, such as small base stations and mobile device terminals, users can get the files nearby, to reduce the delay of users to get the requested content and ease the load on the backhaul link. Therefore, mobile edge caching technology becomes a hot research topic in the field of information and communication.

The key to mobile edge caching technology is how to cache files in devices at the edge of the network. In addition, in order to improve the performance of mobile edge caching, a user behavior reshaping mechanism can be introduced. In recent years, recommendation mechanisms have received increasing attention because of their ability to reshape user request behavior patterns. Recommendation mechanisms can be introduced into caching techniques to recommend appropriate cached content to users, which will increase the probability of their request for the recommendation content and thus improve the cache hit rate.

SUMMARY

The main objective of the present application is to provide an array substrate, which aims to improve the uniformity of display brightness of the display panel.

In order to achieve the above objective, the present application provides the following features:

A joint recommendation and cache optimization method based on a collaboration of multiple base stations, each base station in a target area randomly caching contents stored to the cloud, when each base station in the target area receives a to-be-responded content request, the method comprising:

step A, based on the cached contents in each base station and the to-be-responded content request received by each base station, sequentially calculating a signal-to-noise ratio generated by a connection between each base station and the to-be-responded content request, and filtering signal-to-noise ratios to obtain a signal-to-noise ratio greater than a preset threshold, and establishing a connection relationship between the to-be-responded content request and a base station with a largest signal-to-noise ratio, and taking the base station with the largest signal-to-noise ratio as a target base station;

step B, based on the to-be-responded content request, constructing an access optimization sub-model for obtaining the target base station connected to the to-be-responded content request, a cache optimization sub-model for obtaining each cached contents, and a recommendation optimization sub-model for obtaining a recommendation list of corresponding cached contents;

step C, constructing an optimization problem for each of the recommendation optimization sub-model, the access optimization sub-model and the cache optimization sub-model that correspond to the to-be-responded content request;

step D, solving the optimization problem for each of the access optimization sub-model, the cache optimization sub-model and the recommendation optimization sub-model, calculating a time delay of each sub-model responding to the to-be-responded content request to obtain a total time delay, to obtain the target base station, optimal cached contents and the recommendation list that correspond to the to-be-responded content request.

In an embodiment, the method further includes: based on the access optimization sub-model, the cache optimization sub-model and the recommendation optimization sub-model, when receiving the to-be-responded content request, the base station responding to the to-be-responded content request, and obtaining the recommendation list of cached contents that correspond to the to-be-responded content request, according to a equation below:

$$T_{uf}^{j} = c_{fj}\frac{L_f}{v_{uj}} + (1-c_{fj})u\left(\sum_{j' \in J} c_{fj}\right)\left(\frac{L_f}{v_{uj}} + \frac{L_f}{v_s}\right) + \left[1 - u\left(\sum_{j' \in J} c'_{fj}\right)\right]\left(\frac{L_f}{v_{uj}} + \frac{L_f}{v_c}\right);$$

calculating a time delay $T_{uf}^{j}$ from the to-be-responded content request u connecting with the base station j to obtain the recommendation list f of the cached contents, where $c_{fj}$ is a cache variable, $L_f$ is a size of the recommendation list f of the cached contents, $v_{uj}$ is a transmission rate between the to-be-responded content request u and the base station j, and $u(\bullet)$ is a step function satisfying $$u(x) = \begin{cases} 0, & x \leq 0 \\ 1, & x > 0 \end{cases},$$

is a transmission rate of a wired link between the base stations, and $v_c$ is a rate of the base station downloading files from the cloud;

based on the time delay from the to-be-responded content request connecting with the base station to obtain the recommendation list of cached content, constructing the optimization problem according to a formula below:

$$P1: \min_{r,l,c} \sum_{u \in U} \sum_{f \in F} a_{uf}^{req} \sum_{j \in J} l_{uj} T_{uf}^j$$

$$\text{s.t. } C1: \sum_{j \in J_u} l_{uj} = 1, u \in U$$

$$C2: SINR_{u,j} \geq SINR_{threshold}, u \in U, j \in J_u$$

$$C3: \sum_{f \in F} L_f c_{fj} \leq C_j, j \in J$$

$$C4: \sum_{j \in J} c_{fj} \leq 1, f \in F \quad ;$$

$$C5: \sum_{f \in F} r_{uf} = R_u, u \in U$$

$$C6: r_{uf} \in \{0,1\}, u \in U, f \in F$$

$$C7: l_{uj} \in \{0,1\}, u \in U, j \in J$$

$$C8: c_{fj} \in \{0,1\}, f \in F, j \in J$$

where P1 is the optimization problem, C1 limits each to-be-responded content request to access only one base station, and C2 limits a range of base stations that be accessed by the to-be-responded content request, and C3 constrains a sum of sizes of the cached files in the base station not to exceed a maximum cache capacity of the base station, and C4 limits the cached content in each recommendation list of the cached contents to be cached in at most one base station, C5 constrains a size of the recommendation list of each to-be-responded content request, C6, C7 and C8 indicate that a cache, an access of the to-be-responded content request and cache variables all vary from 0 to 1, where l is an access decision variable, J is a number of base stations, F is a total number of contents stored to the cloud, U is a total number of to-be-responded content requests, r is a recommendation decision variable, $R_u$ is a cache decision variable, and $R_u$ is a size of the recommendation list of to-be-responded content request u.

In an embodiment, the method included constructing the optimization problem in step C comprises a recommendation sub-problem, an access sub-problem, and a cache sub-problem, and obtaining the recommendation sub-problem according to a formula below:

$$P2: \min_r \sum_{u \in U} \sum_{f \in F} a_{uf}^{req} \sum_{j \in J} l_{uj} T_{uf}^j$$

$$\text{s.t. } C5: \sum_{f \in F} r_{uf} = R_u, u \in U \quad ;$$

$$C6: r_{uf} \in \{0,1\}, u \in U, f \in F$$

where P2 is the recommendation sub-problem whose constraints are C5 and C6;

obtaining the access sub-problem according to a formula below:

$$P3: \min_l \sum_{u \in U} \sum_{f \in F} a_{uf}^{req} \sum_{j \in J} l_{uj} T_{uf}^j$$

$$\text{s.t. } C1: \sum_{j \in J_u} l_{uj} = 1, u \in U \quad ;$$

$$C2: SINR_{u,j} \geq SINR_{threshold}, u \in U, j \in J_u$$

$$C7: l_{uj} \in \{0,1\}, u \in U, j \in J$$

where P3 is the access sub-problem whose constraints are C1, C2, C7;

obtaining the cache sub-problem according to a formula below:

$$P4: \min_c \sum_{u \in U} \sum_{f \in F} a_{uf}^{req} \sum_{j \in J} l_{uj} T_{uf}^j$$

$$\text{s.t. } C3: \sum_{f \in F} L_f c_{fj} \leq C_j, j \in J \quad ;$$

$$C4: \sum_{j \in J} c_{fj} \leq 1, f \in F$$

$$C8: c_{fj} \in \{0,1\}, f \in F, j \in J$$

where P4 is the cache sub-problem whose constraints are C3, C4, C8.

In an embodiment, the solving the recommendation sub-problem, based on the recommendation optimization sub-model, by using the optimization method of simulated annealing includes:

step D11, giving an initial recommendation list $R_u$, u∈U, a user access policy l, a cache policy c, and a number of iterations N for each to-be-responded content request;

step D12, when n=1, sequentially performing step D13 to step D14 for all initial recommendation lists within the recommendation optimization sub-model;

step D13, randomly selecting a file f'∈$R_u$, f"∈F\$R_u$, and calculating $T_1=T_u^R(R_u)$ and $T_2=T_u^R(R_u\setminus\{f'\}\cup\{f''\})$, where f' is the cached contents in the recommendation list, $T_1$ and $T_2$ are time delays required for the to-be-responded content request u to request the cached contents under different recommendation lists, $T_u^R(R_u)$ indicates a total time delay of a system when the recommendation list of cached contents corresponding to the to-be-responded content request u is changed to $R_u$, when the recommendation list is known, the to-be-responded content request accesses to the base station and the cache optimization decision is obtained;

step D14, when $T_2<T_1$, updating $R_u=R_u\setminus\{f'\}\cup\{f''\}$; otherwise, calculating $$P = \exp\left(-\frac{T_2 - T_1}{\gamma^n}\right),$$

wherein P indicates a probability for updating the recommendation list of the cached contents that correspond to the to-be-responded content request by simulating an energy transfer probability in an annealing algorithm, γ is an annealing rate;

step D15, when P≥random(0,1), updating $R_u=R_u\setminus\{f'\}\cup\{f''\}$; otherwise, keeping the recommendation list unchanged, wherein random(0,1) indicates a probability of randomly taking a real number from 0 to 1, wherein P≥random(0,1) indicates updating the recommendation list of the to-be-responded content request with P.

In an embodiment, solving the access sub-problem, based on the access optimization sub-model, by using an optimization method of a coalition game includes:

step D21, taking all to-be-responded content requests of the accessed base stations j∈J as a coalition $S_j$, wherein there are J coalitions, J is a number of base stations in the target area, the J coalitions form a coalition structure AS={$S_1$, $S_2$, ..., $S_J$}, one to-be-responded content request belongs to one coalition, and each to-be-responded content request is transferred from one coalition to another coalition according to a transfer guideline;

wherein when the coalition structure is AS={$S_1$, $S_2$, ..., $S_J$} and to-be-responded content request u∈$S_i$ is required to be transferred from a coalition $S_i$ to a coalition $S_j$, the coalition structure becomes $AS'=\{AS\backslash\{S_i, S_j\}\}\cup\{S_i\backslash\{u\}\}\cup\{S_j\cup\{u\}\}$, the total time delay of the system is delay (AS) when the coalition structure is AS, the transfer guideline is $AS'>AS \Leftrightarrow delay(AS)>delay(AS')$;

where the transfer guideline-allows to transfer when the transferred coalition structure bring about a lower total time delay of the system compared to a current coalition;

step D22, giving a recommendation policy r of each to-be-responded content request, an initial access policy l of the target base station and a cache policy c, and a number of iterations N for each to-be-responded content request, setting a number of iterations to be N, with n=1, and each to-be-responded content request initializing the coalition structure by the base station with the largest received signal-to-noise ratio;

step D23, calculating delay($AS^{n-1}$) according to a current coalition structure for each to-be-responded content request in the coalitions, when the to-be-responded content request currently joins a coalition $S'^{i-1}_i$, and for all base stations j∈J in the target area, according to a formula below:

$$AS_j^n = \{AS^{n-1}\backslash\{S_i^{n-1}, S_j^{n-1}\}\} \cup \{S_i^{n-1}\backslash\{u\}\} \cup \{S_j^{n-1} \cup \{u\}\};$$

$$k \leftarrow \underset{j \in J}{\operatorname{argmax}}[\operatorname{delay}(AS^{n-1}) - \operatorname{delay}(AS_j^n)];$$

when transferring a user u from a coalition $S_i^{n-1}$ to a coalition $S_j^{n-1}$ meets the transfer guideline, updating the coalition structure $AS^n=AS_k^n$; otherwise, keeping the coalition structure unchanged $AS^n=AS^{n-1}$, n is a current number of iterations, when n is equal to N, outputting results of accessed sub-problems.

In an embodiment, solving the cache sub-problem based on the cache optimization sub-model by using a cache optimization method of an improved greedy algorithm includes:

step D31, when a global cache variable corresponding to each base station is a zero vector, combining a recommendation policy r, an access policy l, an initial cache policy c, and a number of iterations N for each to-be-responded content request;

step D32, when n=1, then $S=F/C\cup C_j, C_j=\emptyset$, when $S\neq\emptyset$, then $$f' \leftarrow \underset{f \in S}{\operatorname{argmax}} \frac{T_j(C_j \cup \{f\}) - T_j(C_j)}{L_f},$$

when $$\sum_{f \in C_j \cup \{f'\}} L_f \leq C_j,$$

then $S=S\backslash\{f'\}$, $c_{fj}=1$, otherwise, $S=S\backslash\{f'\}$;

where $T_j(C_j)$ indicates a total time delay of the system of a set of cached contents $C_j$ in the target base station j, when a global recommendation, the access of the target base station and cache decisions are known.

In an embodiment, the method includes: performing an iterative loop, by the access optimization sub-model, the cache optimization sub-model and the recommendation optimization sub-model, based on their corresponding optimization sub-problems and a number of iterations N;

after N iterations, obtaining the target base station, the optimal cache contents and the recommendation list of the to-be-responded content request, and responding to the to-be-responded content request.

A joint recommendation and cache optimization method based on a collaboration of multiple base stations in the present application, following technical effects can be brought by using the above technical solution compared with the prior art.

1. The method of the present application aims at minimizing the total transmission delay of the system, and can bring about a significant reduction in delay with a lower cache capacity by jointly optimizing recommendation decision, access decision and cache decision.

2. Most studies start from the global popularity of content and assume that content request preferences are homogeneous, ignoring that content request preferences vary from person to person, such that the caching performance of the system is reduced. Therefore, in order to improve the performance of mobile edge caching, a recommendation mechanism is introduced to reshape the request behavior patterns of users. By recommending appropriate cached content, the probability of requesting for the recommendation content is increased, to improve the cache hit rate.

3. To solve the joint optimization problem in the present application, it is decoupled into three sub-problems, namely, the recommendation optimization sub-problem, the access optimization sub-problem, and the cache optimization sub-problem. The recommendation optimization sub-problem is solved by using the recommendation decision optimization method based on simulated annealing algorithm, and the range of files in the recommendation list is restricted by defining the files of interest to the user in order to take into account the user experience, to avoid the recommendation mechanism causing user resentment; the user access problem is solved by using the method based on the coalition game to obtain the access decision. The cache optimization method based on the improved greedy algorithm is used to solve the cache optimization sub-problem to obtain the cache decision.

DETAILED DESCRIPTION OF THE EMBODIMENTS

In order to better understand the technical aspects of the present application, specific embodiments are given and illustrated below with the drawings.

Aspects of the present application are described in the present application with reference to the drawings, in which a number of illustrated embodiments are shown. Embodiments of the present application need not be defined to include all aspects of the present application. It should be understood that the multiple ideas and embodiments described above, and those described in more detail below, can be implemented in any one of many ways, due to the fact that the ideas and embodiments disclosed in the present application are not limited to any one embodiment. In addition, some aspects of the present application may be used alone, or in any appropriate combination with other aspects of the present application application.

Figure 1:
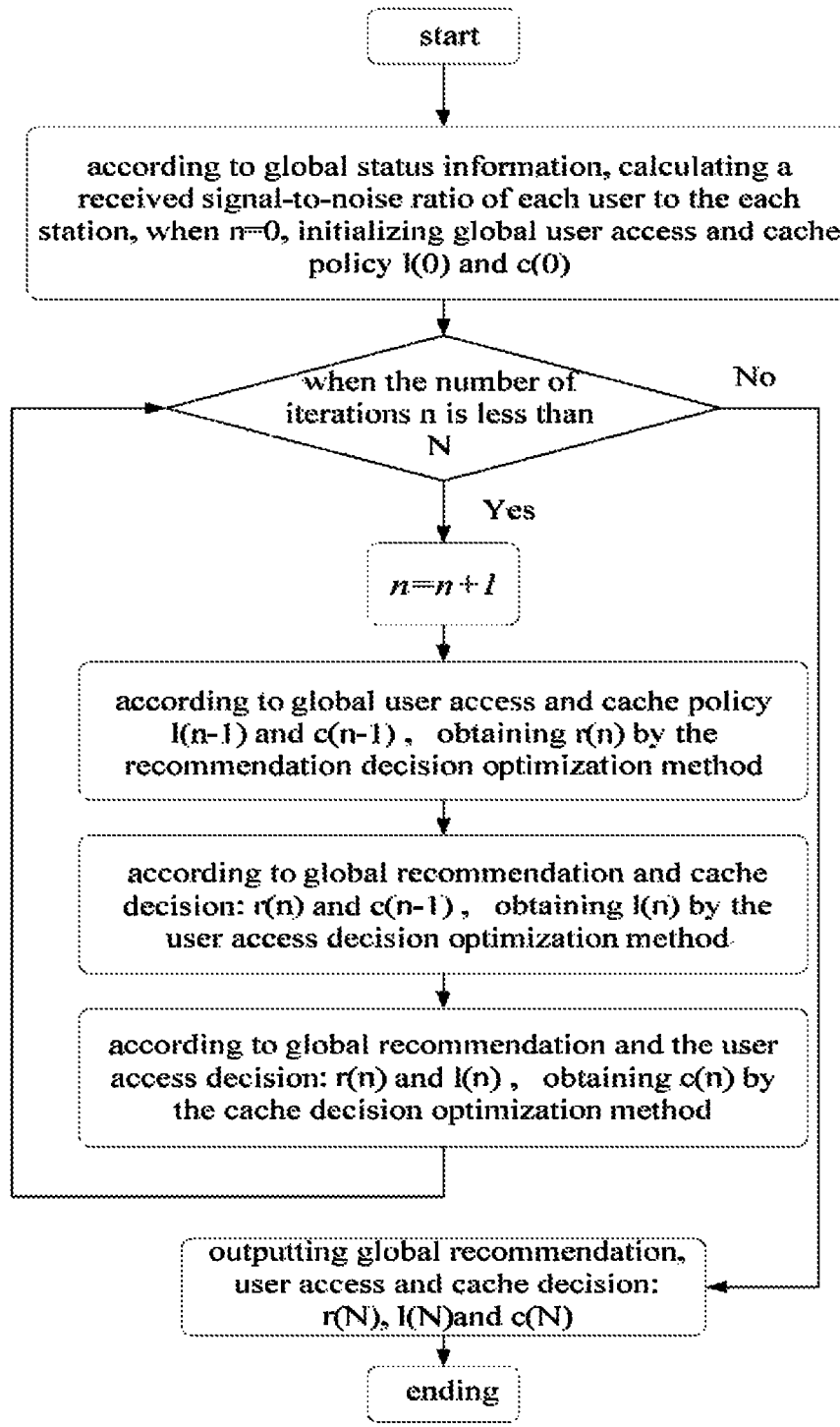
FIG. 1 is a flowchart of a joint recommendation and cache optimization method according to an embodiment of the present application.
Figure 2:
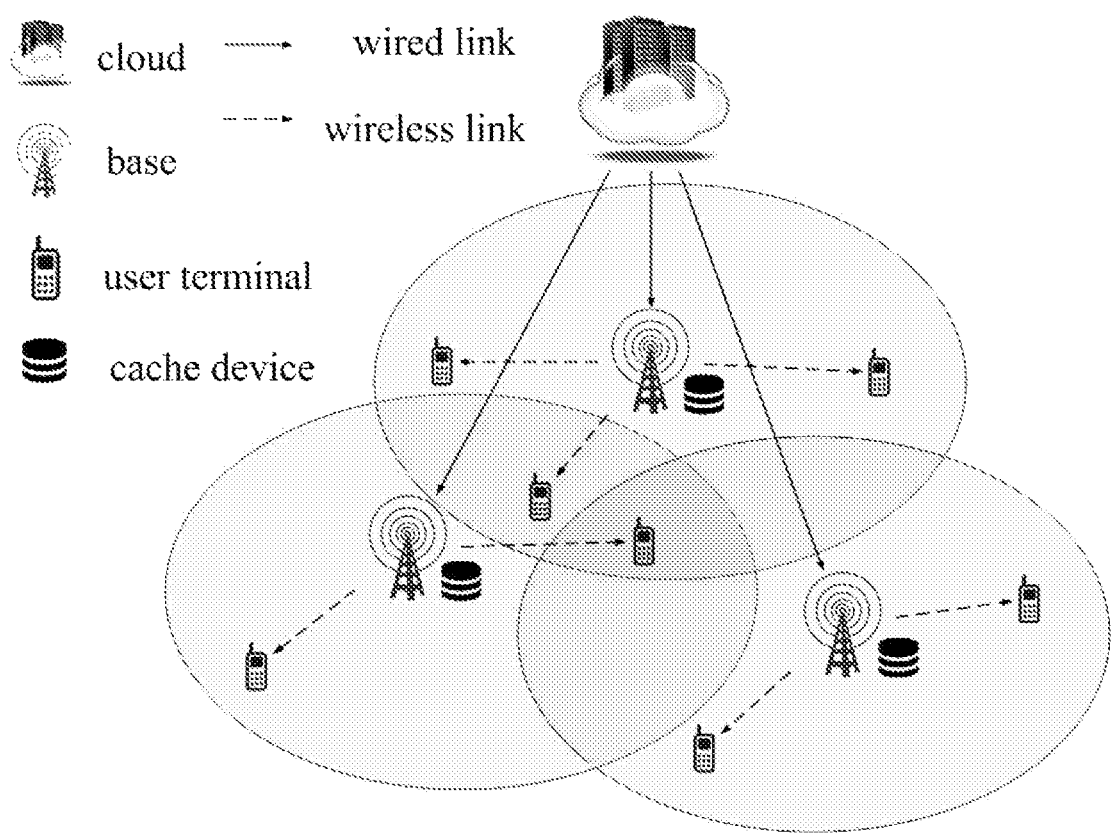
FIG. 2 is a schematic diagram of a system model corresponding to a joint recommendation and cache optimization method according to an an embodiment of the present application.
Figure 3:
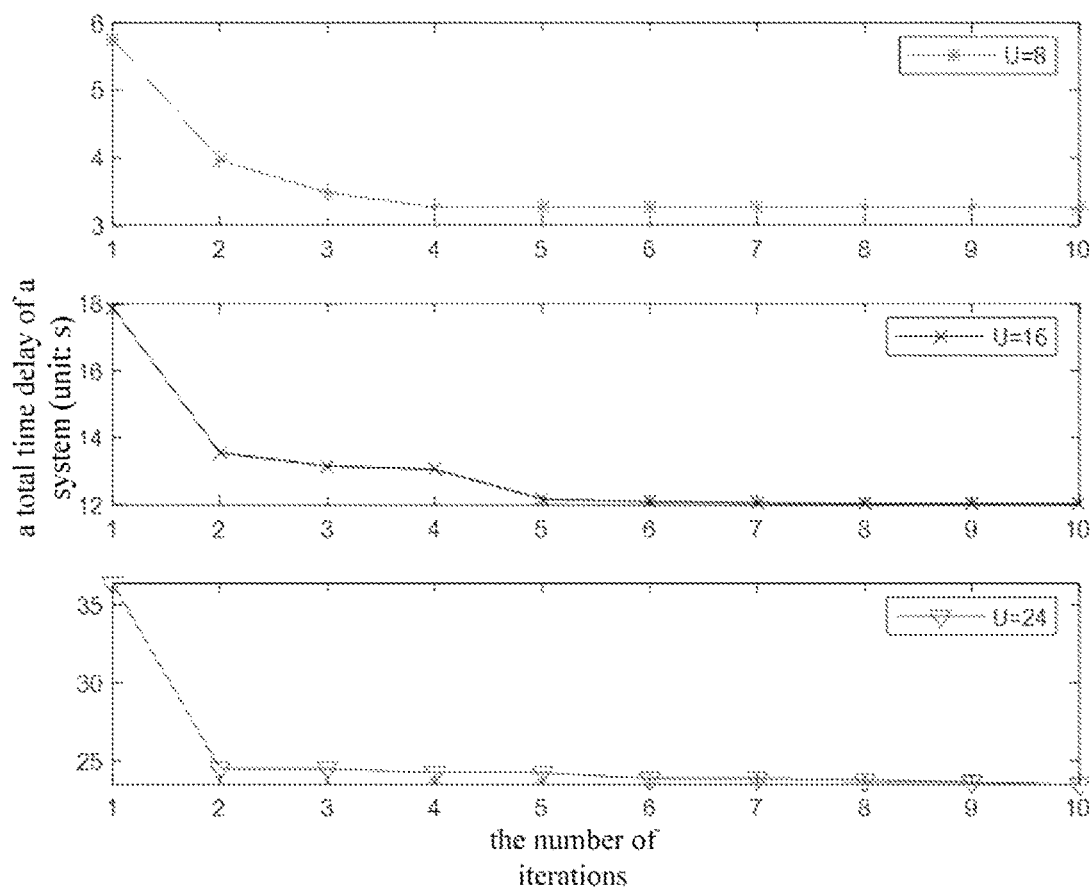
FIG. 3 is a schematic diagram of a performance simulation of a joint recommendation and cache optimization method at different numbers of users according to an an embodiment of the present application.

Referring to FIGS. 1 to 3, the present application provides a joint recommendation and cache optimization method based on a collaboration of multiple base stations, each base station in a target area randomly caching contents stored to the cloud, when each base station in the target area receives a to-be-responded content request, the method including:

step A, based on the cached contents in each base station and the to-be-responded content request received by each base station, sequentially calculating a signal-to-noise ratio generated by a connection between each base station and the to-be-responded content request, and filtering signal-to-noise ratios to obtain a signal-to-noise ratio greater than a preset threshold, and establishing a connection relationship between the to-be-responded content request and a base station with a largest signal-to-noise ratio, and taking the base station with the largest signal-to-noise ratio as a target base station;

step B, based on the to-be-responded content request, constructing an access optimization sub-model for obtaining the target base station connected to the to-be-responded content request, a cache optimization sub-model for obtaining each cached contents, and a recommendation optimization sub-model for obtaining a recommendation list of corresponding cached contents;

step C, constructing an optimization problem for each of the recommendation optimization sub-model, the access optimization sub-model and the cache optimization sub-model that correspond to the to-be-responded content request:

step D, solving the optimization problem for each of the access optimization sub-model, the cache optimization sub-model and the recommendation optimization sub-model, calculating a time delay of each sub-model responding to the to-be-responded content request to obtain a total time delay, to obtain the target base station, optimal cached contents and the recommendation list that correspond to the to-be-responded content request.

The joint recommendation and cache optimization method in the collaboration scenario of multiple base stations in the present application assumes different sizes of files to minimize the total transmission delay of the system by jointing the optimization recommendation, the user access, and cache decisions under the constraints of the size of recommendation list, cache capacity, and channel bandwidth.

EMBODIMENT

The mobile edge caching network model of the present application is shown in FIG. 2. J base stations, J={1, 2, . . . , J} and U to-be-responded content requests, U={1, 2, . . . , U}, are distributed in a hotspot area. Each to-be-responded content request can be viewed as a user in the embodiment of the present application. Since the cache capacity $C_j$ of each base station j is limited, such that the cached content of each base station can be shared through the link between the base stations. Assuming that the cloud server has an infinite cache capacity to provide all the files requested by the user, i.e., it is able to obtain all the cached contents, and a recommendation list of cached contents that correspond to each to-be-responded content request. Each user can be covered by multiple base stations, but can only access the requested files by connecting to one of the target base stations. Assuming that there are F files consisting of cached contents in the system, and the set of files is F={1, 2, . . . , F}. All users within the model have their own independent preference distribution for these F files. For both the user u∈U and the file f∈F, $a_{uf}^{pref}$ indicates the preference of the user u for the file f, that is the probability of the to-be-responded request u sent by the user requesting the cached contents corresponding to the files, without the introduction of a recommendation mechanism.

The individual model mechanisms involved in the present application are as follows.

The user access and caching mechanism:

Combined with the content in step A, when a signal-to-noise ratio of the to-be-responded content request sent by the user to the base station is greater than a threshold value, the user can access the base station; otherwise, the user cannot access the base station, the set of base stations accessible to the user u is $J_u$, i.e., the target base station. The threshold value of the signal-to-noise ratio is $SINR_{threshold}$, if the user u accesses the base station j, then its received signal-to-noise ratio $SINR_{u,j}$ is required to meet the following conditions:

$$SINR_{u,j} \geq SINR_{threshold}, u \in U, j \in J_u.$$

An access variables of the user u and the base station j are $l_{uj} \in \{0,1\}$, if $l_{uj}=1$, then it means that the user u is connected to the base station j and the global user access decision is $l@(l_{uj})_{j \in J, u \in U}$. Considering that a user may be covered by more than one base station, but can only access one base station, there exists a constraint $$\sum_{j \in J_u} l_{uj} = 1, u \in U,$$

the number of users accessing the base station $$j \text{ is}: k_j = \sum_{u \in U} l_{uj}, j \in J.$$

Since the cache capacity of each base station is limited, there exists $$\sum_{f \in F} L_f c_{fj} \leq C_j, j \in J.$$

Where $C_j$ is the cache capacity of the base station (unit: KB), $L_f$ is the size of the file (unit: KB), $c_{fj}$ is the cache variable, $c_{fj} \in \{0,1\}$, if $c_{fj}=1$, then the file f is cached in the base station j and all base stations cache decision is c@ $(c_{fj})_{j \in J, f \in F}$. In order to avoid redundancy caused by multiple base stations caching the same file in the system, each file is limited to be cached in at most one base station, so there exists the constraint:

$$\sum_{j \in J} c_{fj} \leq 1, f \in F.$$

The user preference and recommendation mechanism:

$a_{uf}^{pref}$ is the user's preference for a file f and satisfies a condition $$\sum_{f \in F} a_{uf}^{pref} = 1, u \in U,$$

a recommendation mechanism being introduced in the cache can reshape the probability distribution of user requesting for files, so that user requesting for files are influenced by both the original preference and the recommendation content. For the user u∈U and the file f∈F, the recommendation variable is $r_{uf} \in \{0,1\}$, if, $r_{uf}=1$, then the file f is recommended to the user u, and the global recommendation decision variable is $r@(r_{uf})_{j \in J, u \in U}$.

Considering that the screen size is limited when the user uses mobile devices, the number of files recommended to each user is constrained by $$\sum_{f \in F} r_{uf} = R_u, u \in U.$$

where $R_u$ is the size of the recommendation list of the user u, and the list of files recommended to the user is $R_u$, $\|R_u\| = R_u$.

After the recommendation mechanism is introduced, the probability of requesting for a file f∈$R_u$ in the recommendation list when the user u accepts the recommendation is $$\hat{a}_{uf}^{req} = \frac{r_{uf} a_{uf}^{pref}}{\sum_{f \in R_u} a_{uf}^{pref}} = \frac{r_{uf} a_{uf}^{pref}}{\sum_{f \in F} r_{uf} a_{uf}^{pref}}$$

Similarly, when the user u does not accept the recommendation, the probability of requesting for a file f∈F\$R_u$ not in the recommendation list is $$\tilde{a}_{uf}^{req} = \frac{(1-r_{uf}) a_{uf}^{pref}}{\sum_{f \in F \setminus R_u} a_{uf}^{pref}} = \frac{(1-r_{uf}) a_{uf}^{pref}}{\sum_{f \in F} (1-r_{uf}) a_{uf}^{pref}}.$$

Finally, the probability $a_{uf}^{ref}$ of requesting for a file f∈F by the user u∈U is $$a_{uf}^{req} = \Delta_u \hat{a}_{uf}^{req} + (1-\Delta_u) \tilde{a}_{uf}^{req} = \Delta_u \frac{r_{uf} a_{uf}^{pref}}{\sum_{f \in F} r_{uf} a_{uf}^{pref}} + (1-\Delta_u) \frac{(1-r_{uf}) a_{uf}^{pref}}{\sum_{f \in F} (1-r_{uf}) a_{uf}^{pref}}.$$

where $\Delta_u$ is the probability $\Delta_u \in (0,1)$ that the user accepts the recommendation.

The probability $\Delta_u$ of the user accepting recommendation is introduced because not all users are willing to accept recommendation, and different users have different acceptance of recommendation mechanism, and the probability is closely related to the recommended files. For example, if all the files in the recommendation list are of interest to the user, then his acceptance probability of the recommendation mechanism is high, and the probability of the user requesting for the files in the list is higher, otherwise, if there is content in the recommendation list that is not of interest to the user, then the user's request probability due to the recommendation mechanism is reduced, and the user prefers to access files outside the recommendation list, which reduces the cache hit rate of the system. In the present application, the files of interest to the user u refer to the files $\lambda_u \cdot F$ ranked in the top of the user's preferences, where $\lambda_u$ indicates the percentage of interest of the user u, that is the proportion of the files of interest to the user to all files, F is the total number of files, $\lambda_u \in (0,1)$, u∈U. $R_u^{interest} = \{f | f \in R_u, \text{rank}_u^{pref}(f) \geq \lambda_u \cdot F\}$ is a set of files that are interest to the user and appear in the recommendation list, where $\text{rank}_u^{pref}(f)$ is a rank of the file f in the user's preference for all files. The number of files in the $R_u^{interest}$ is $R_u^{interest}$, $R_u^{interest} = \|R_u^{interest}\|$.

The expression for calculating the probability of user's u acceptance of the recommendation mechanism in the embodiment is: $\Delta_u = R_u^{interest}/R_u$, where $R_u$ is a size of the recommendation list of the user u.

Wireless Transmission Model

In the present application, frequency division multiplexing is used within each base station, and all base stations multiplex the same frequency band, so that there is interference between cells and no interference within cells. It is assumed that any base station can obtain all channel state information. For the user u, the received signal-to-noise ratio of the received signal from the base station j is $$SINR_{u,j} = \frac{h_{u,j} P_j}{\sum_{j' \in J \setminus \{j\}} h_{u,j'} P_{j'} + \sigma_N^2},$$

where $h_{u,j}$ is a channel gain from the base station j to the user u, $P_j$ is a transmit power of the base station j, the noise is zero-mean Gaussian white noise, and the variance is $\sigma_N^2$.

The channel fading model of the present application uses the COST231-Hata model, and the channel gain $h_{u,j}$ of the base station j transmitting signal to the user u is calculated as follows $h_{u,j} = 46.3 + 33.9 \lg(f) - 13.82 \lg(h_h) - a(h_{in}) + \{44.9 - 6.55 \lg(h_h)\} d_{uf} + C_{in}$.

Where f is the base station operation frequency (unit: MHz), $h_h$ is an effective height of the base station antenna (unit: m), $h_{ui}$ is a user terminal antenna height (unit: m), $a(h_m)$ is a user terminal height factor, $d_{uf}$ is a distance between the user u and the base station j (unit: km), and $C_m$ is the ground fading correction value (unit: dB). The user terminal height factor is calculated as follows $a(h_{in}) = 8.29 [\lg(1.54 h_{in})]^2 - 1.1$.

Assuming that all base stations are multiplexed with the bandwidth B, and each base station B distributes the bandwidth resources evenly to the connected users. Since the number of users connected to the base station j is $k_j$, the bandwidth obtained by each user is $$\frac{B}{k_j},$$

and the information transmission rate between the user u and the base station j∈J$_u$ can be obtained according to shannon's formula as $$v_{uj} = \frac{B}{k_j}(1 + \text{SINR}_{u,j}).$$

In order to improve user's satisfaction, the present application expects to reduce the time delay of user obtaining files through optimization, and when the to-be-responded content request u∈U of the user accesses to the base station j∈J, obtaining the cached contents f∈F is divided into three cases.

The user accesses a base station j that caches the requested file, and the user downloads the file directly from the accessed base station, at this time, the time delay for obtaining the file is $$T_1 = \frac{L_f}{v_{uj}},$$

$L_f$ the size of the file f, the transmission rate between the user and the base station is $v_{uf}$.

The user accesses a base station j that has not cached the requested file, but other base stations have cached the file. The file cached in the other base station is obtained through the wired link between base stations, and the user then downloads the file through the accessed base station. The time delay at this time is $$T_2 = \frac{L_f}{v_{uj}} + \frac{L_f}{v_s},$$

$v_s$ is the transmission rate of the wired link between the base stations

All base stations do not cache the file requested by the user, so they can only download the file from the cloud to the base station through the backhaul link, and then the user downloads the file through the base station. The time delay at this time is $$T_3 = \frac{L_f}{v_{uj}} + \frac{L_f}{v_c},$$

$v_x$ is the rate at which the base station downloads the file from the cloud server.

The time delay $T_1$, $T_2$, $T_3$ of the above three scenarios satisfy $T_1 < T_2 < T_3$. Considering that the transmission rate of the wired link between base stations must be much greater than the transmission rate of the backhaul link, that is, $v_x > v_c$.

According to the above analysis, it can be noted that the time delay of obtaining the file f when the user u assesses to the base station j is:

$$T_{uf}^j = c_{fj}\frac{L_f}{v_{uj}} + (1-c_{fj})u\left(\sum_{j'\in J} c_{fj}\right)\left(\frac{L_f}{v_{uj}} + \frac{L_f}{v_s}\right) + \left[1 - u\left(\sum_{j'\in J} c'_{fj}\right)\right]\left(\frac{L_f}{v_{uj}} + \frac{L_f}{v_c}\right)$$

where $c_{fj}$ is the cache variable and u(•) is the step function that satisfies $$u(x) = \begin{cases} 0, & x \leq 0 \\ 1, & x > 0 \end{cases}.$$

According to the formula for obtaining the time delay, it is known that the content of the recommendation list, the transmission rate between the user and the base station and the cache content of the base station have an impact on the time delay, where the recommendation content is related to the recommendation policy, the transmission rate is related to the user's access mechanism, and the cache content of the base station is related to the cache policy. Therefore, by combining the processes from step B to step D, the access optimization sub-model, the cache optimization sub-model, and the recommendation optimization sub-model are constructed for joint optimization to minimize the total time delay of the obtained content request.

The present application proposes a joint recommendation and cache optimization method based on a collaboration caching scenario of multiple base stations, with recommendation, user access and cache policy as optimization variables, the optimization problem of minimizing the total time delay of the system is constructed under the constraints of cache capacity, the size of recommendation list, and bandwidth, etc., and is decoupled into three sub-problems of recommendation, user access and cache, which are solved by three methods.

Figure 4:
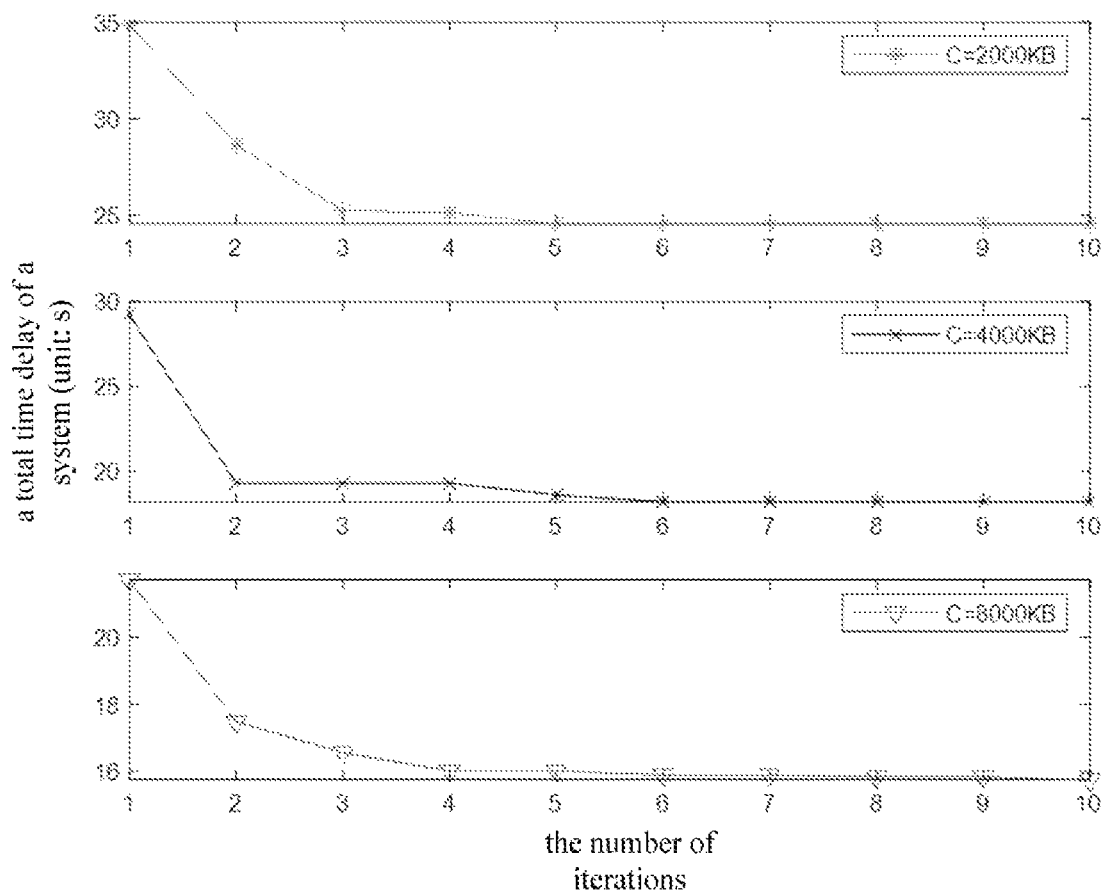
FIG. 4 is a schematic diagram of a performance simulation of a joint recommendation and cache optimization method under different cache capacities according to an an embodiment of the present application.

As shown in FIGS. 3 and 4, it can be seen that the joint optimization method used in the present application converges quickly when the number of users and the cache capacity of the base station take different values. In addition, the convergence times of the joint optimization method are basically constant when the number of users and the base station cache capacity are increased exponentially, which means the good applicability of the present application.

Figure 5:
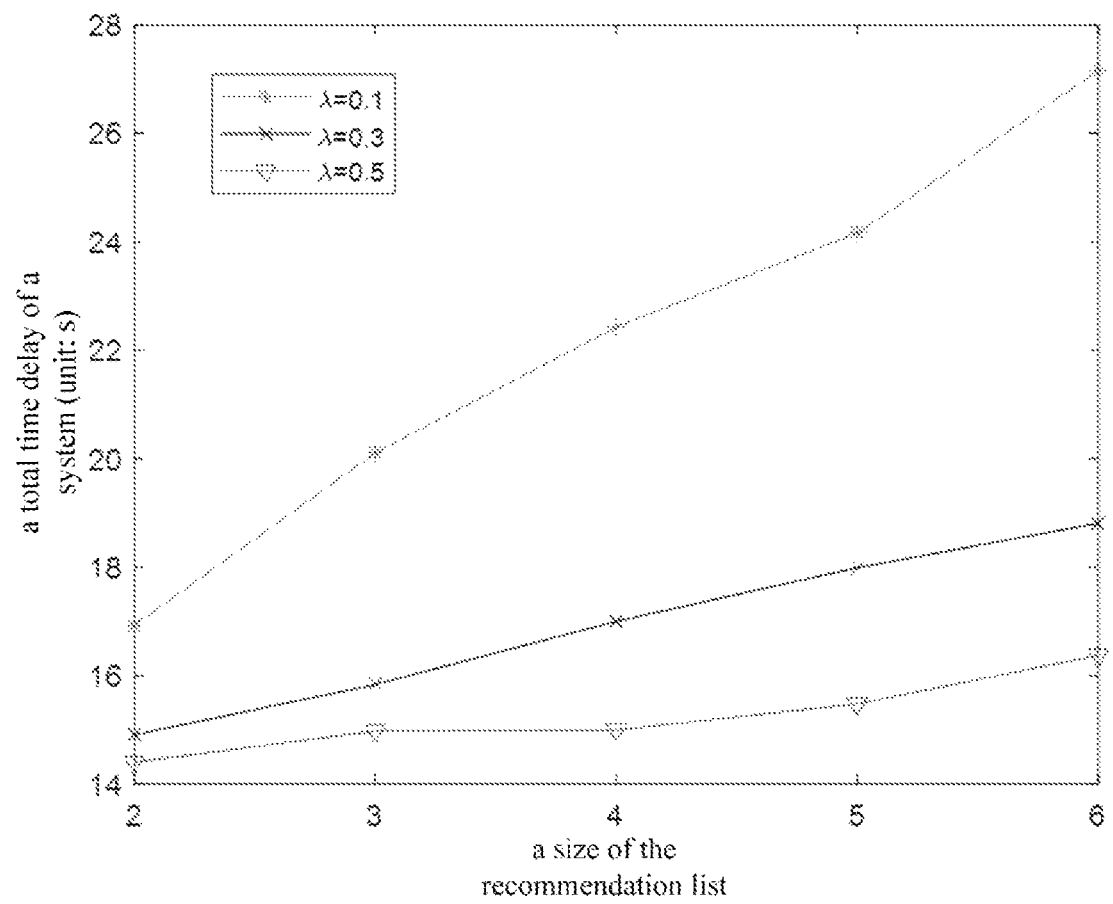
FIG. 5 is a schematic diagram of a performance simulation of the total time delay of a system for changing a size of the recommendation list according to the embodiment of the present application.

FIG. 5 gives the effect of changing the size of the recommendation list on the total time delay of the system under different user interest percentages λ. As shown in FIG. 5, it can be seen that the total time delay of the system increases with the increase of the size of the recommendation list when the percentage of the user's interest is constant. This is due to the fact that the increase of the recommendation list destroys the homogeneity of user preference distribution, i.e., the probability distribution of user requesting for files is more independent, which reduces the caching efficiency of the system and thus increases the total time delay of the system. At the same time, when the percentage of user's interest becomes larger, the total time delay of the system is less affected by the size of the recommendation list, because the larger the list, the more files the user is interested in, and the larger range of files that can be recommended without causing user disgust, to reduce the negative impact of the larger recommendation list.

Although the present application is disclosed with embodiments as described above, it is not intended to limit the present application. Those skilled in the art to which the present application belongs may make various changes and modifications without departing from the scope of the present application. Therefore, the scope of the present application shall be subject to that defined in the claims.

What is claimed is:

1. A joint recommendation and cache optimization method based on a collaboration of multiple base stations, each base station in a target area randomly caching contents stored to the cloud, when each base station in the target area receives a to-be-responded content request, the method comprising:

step A, based on the cached contents in each base station and the to-be-responded content request received by each base station, sequentially calculating a signal-to-noise ratio generated by a connection between each base station and the to-be-responded content request, and filtering signal-to-noise ratios to obtain a signal-to-noise ratio greater than a preset threshold, and establishing a connection relationship between the to-be-responded content request and a base station with a largest signal-to-noise ratio, and taking the base station with the largest signal-to-noise ratio as a target base station;

step B, based on the to-be-responded content request, constructing an access optimization sub-model for obtaining the target base station connected to the to-be-responded content request, a cache optimization sub-model for obtaining each cached contents, and a recommendation optimization sub-model for obtaining a recommendation list of corresponding cached contents;

step C, constructing an optimization problem for each of the recommendation optimization sub-model, the access optimization sub-model and the cache optimization sub-model that correspond to the to-be-responded content request;

step D, solving the optimization problem for each of the access optimization sub-model, the cache optimization sub-model and the recommendation optimization sub-model, calculating a time delay of each sub-model responding to the to-be-responded content request to obtain a total time delay, to obtain the target base station, optimal cached contents and the recommendation list that correspond to the to-be-responded content request.

2. The joint recommendation and cache optimization method according to claim 1, further comprising:

based on the access optimization sub-model, the cache optimization sub-model and the recommendation optimization sub-model, when receiving the to-be-responded content request, the base station responding to the to-be-responded content request, and obtaining the recommendation list of cached contents that correspond to the to-be-responded content request, according to a equation below:

$$T_{uf}^j = c_{fj}\frac{L_f}{v_{uj}} + (1-c_{fj})u\left(\sum_{j'\in J}c_{fj}\right)\left(\frac{L_f}{v_{uj}}+\frac{L_f}{v_s}\right)+\left[1-u\left(\sum_{j'\in J}c'_{fj}\right)\right]\left(\frac{L_f}{v_{uj}}+\frac{L_f}{v_c}\right);$$

calculating a time delay $T_{uf}^j$ from the to-be-responded content request u connecting with the base station j to obtain the recommendation list f of the cached contents, where $c_{fj}$ is a cache variable, $L_f$ is a size of the recommendation list f of the cached contents, $v_{uf}$ is a transmission rate between the to-be-responded content request u and the base station j, and u(•) is a step function satisfying $$u(x)=\begin{cases}0, & x\le 0\\1, & x>0\end{cases},$$

$v_s$ is a transmission rate of a wired link between the base stations, and $v_c$ is a rate of the base station downloading files from the cloud;

based on the time delay from the to-be-responded content request connecting with the base station to obtain the recommendation list of cached content, constructing the optimization problem according to a formula below:

$$P1: \min_{r,l,c}\sum_{u\in U}\sum_{f\in F}a_{uf}^{req}\sum_{j\in J}l_{uj}T_{uf}^j$$

s.t. $C1: \sum_{j\subset J_u}l_{uj}=1, u\in U$ $C2: \text{SINR}_{u,j} \ge \text{SINR}_{threshold}, u\in U, j\in J_u$ $C3: \sum_{f\in F}L_f c_{fj}\le C_j, j\in J$ $C4: \sum_{j\in J}c_{fj}\le 1, f\in F$ ;

$C5: \sum_{f\in F}r_{uf}=R_u, u\in U$ $C6: r_{uf}\in\{0,1\}, u\in U, f\in F$ $C7: l_{uj}\in\{0,1\}, u\in U, j\in J$ $C8: c_{fj}\in\{0,1\}, f\in F, j\in J$ where P1 is the optimization problem, C1 limits each to-be-responded content request to access only one base station, and C2 limits a range of base stations that be accessed by the to-be-responded content request, and C3 constrains a sum of sizes of the cached files in the base station not to exceed a maximum cache capacity of the base station, and C4 limits the cached content in each recommendation list of the cached contents to be cached in at most one base station, C5 constrains a size of the recommendation list of each to-be-responded content request, C6, C7 and C8 indicate that a cache, an access of the to-be-responded content request and cache variables all vary from 0 to 1, where l is an access decision variable, J is a number of base stations, F is a total number of contents stored to the cloud, U is a total number of to-be-responded content requests, r is a recommendation decision variable, $R_u$ is a cache decision variable, and $R_u$ is a size of the recommendation list of to-be-responded content request u.

3. The joint recommendation and cache optimization method according to claim 2, wherein constructing the optimization problem in step C comprises a recommendation sub-problem, an access sub-problem, and a cache sub-problem, and obtaining the recommendation sub-problem according to a formula below:

$$P2:\min_r\sum_{u\in U}\sum_{f\in F}a_{uf}^{req}\sum_{j\in J}l_{uj}T_{uf}^j$$

s.t. $C5: \sum_{f\in F}r_{uf}=R_u, u\in U$ ;

$C6: r_{uf}\in\{0,1\}, u\in U, f\in F$ where P2 is the recommendation sub-problem whose constraints are C5 and C6;

obtaining the access sub-problem according to a formula below:

$$P3: \min_l \sum_{u \in U} \sum_{f \in F} a_{uf}^{req} \sum_{j \in J} l_{uj} T_{uf}^j$$

$$\text{s.t.} \quad C1: \sum_{j \in J_u} l_{uj} = 1, u \in U$$

$$C2: \text{SINR}_{u,j} \geq \text{SINR}_{threshold}, u \in U, j \in J_u;$$

$$C7: l_{uj} \in \{0, 1\}, u \in U, j \in J$$

where P3 is the access sub-problem whose constraints are C1, C2, C7;

obtaining the cache sub-problem according to a formula below:

$$P4: \min_c \sum_{u \in U} \sum_{f \in F} a_{uf}^{req} \sum_{j \in J} l_{uj} T_{uf}^j$$

$$\text{s.t.} \quad C3: \sum_{f \in F} L_f c_{fj} \leq C_j, j \in J$$

$$C4: \sum_{j \in J} c_{fj} \leq 1, f \in F$$

$$C8: c_{fj} \in \{0, 1\}, f \in F, j \in J$$

where P4 is the cache sub-problem whose constraints are C3, C4, C8.

4. The joint recommendation and cache optimization method according to claim 3, wherein solving the recommendation sub-problem, based on the recommendation optimization sub-model, by using the optimization method of simulated annealing comprises:

step D11, giving an initial recommendation list $R_u$, u∈U, a user access policy l, a cache policy c, and a number of iterations N for each to-be-responded content request;

step D12, when n=1, sequentially performing step D13 to step D14 for all initial recommendation lists within the recommendation optimization sub-model;

step D13, randomly selecting a file f'∈$R_u$,f"∈F\$R_u$, and calculating $T_1 = T_n^R(R_u)$ and $T_2 = T_u^R(R_u \setminus \{f'\} \cup \{f''\})$, where is the cached contents in the recommendation list, $T_1$ and $T_2$ are time delays required for the to-be-responded content request u to request the cached contents under different recommendation lists, $T_u^R(R_u)$ indicates a total time delay of a system when the recommendation list of cached contents corresponding to the to-be-responded content request u is changed to $R_u$, when the recommendation list is known, the to-be-responded content request accesses to the base station and the cache optimization decision is obtained;

step D14, when $T_2 < T_1$, updating $R_u = R_u \setminus \{f'\} \cup \{f''\}$; otherwise, calculating $$P = \exp\left(-\frac{T_2 - T_1}{\gamma^n}\right),$$

wherein P indicates a probability for updating the recommendation list of the cached contents that correspond to the to-be-responded content request by simulating an energy transfer probability in an annealing algorithm, γ is an annealing rate;

step D15, when P≥random(0,1), updating $R_u = R_u \setminus \{f'\} \cup \{f''\}$; otherwise, keeping the recommendation list unchanged, wherein random(0,1) indicates a probability of randomly taking a real number from 0 to 1, wherein P≥random(0,1) indicates updating the recommendation list of the to-be-responded content request with P.

5. The joint recommendation and cache optimization method according to claim 3, wherein solving the access sub-problem, based on the access optimization sub-model, by using an optimization method of a coalition game comprises:

step D21, taking all to-be-responded content requests of the accessed base stations j∈J as a coalition $S_j$, wherein there are J coalitions, J is a number of base stations in the target area, the J coalitions form a coalition structure AS={$S_1, S_2, \ldots, S_J$}, one to-be-responded content request belongs to one coalition, and each to-be-responded content request is transferred from one coalition to another coalition according to a transfer guideline;

wherein when the coalition structure is AS={$S_1, S_2, \ldots, S_J$} and to-be-responded content request u∈$S_i$ is required to be transferred from a coalition $S_i$ to a coalition $S_j$, the coalition structure becomes AS'={AS\{$S_i,S_j$}}∪{$S_i$\{u}}∪{$S_j$∪{u}}, the total time delay of the system is delay(AS) when the coalition structure is AS, the transfer guideline is AS'>AS⇔delay(AS)>delay(AS'):

where the transfer guideline > allows to transfer when the transferred coalition structure bring about a lower total time delay of the system compared to a current coalition;

step D22, giving a recommendation policy r of each to-be-responded content request, an initial access policy l of the target base station and a cache policy c, and a number of iterations N for each to-be-responded content request, setting a number of iterations to be N, with n=1, and each to-be-responded content request initializing the coalition structure by the base station with the largest received signal-to-noise ratio;

step D23, calculating delay($AS^{n-1}$) according to a current coalition structure for each to-be-responded content request in the coalitions, when the to-be-responded content request currently joins a coalition $S_i^{n-1}$, and for all base stations j∈J in the target area, according to a formula below:

$$AS_j^n = \{AS^{n-1} \setminus \{S_i^{n-1}, S_j^{n-1}\}\} \cup \{S_i^{n-1} \setminus \{u\}\} \cup \{S_j^{n-1} \cup \{u\}\}$$

$$k \leftarrow \underset{j \in J}{\arg\max}[\text{delay}(AS^{n-1}) - \text{delay}(AS_j^n)]$$

when transferring a user u from a coalition $S_i^{n-1}$ to a coalition $S_k^{n-1}$ meets the transfer guideline, updating the coalition structure $AS^n = AS^{n-1}$; otherwise, keeping the coalition structure unchanged $AS^n = AS^{n-1}$, n is a current number of iterations, when n is equal to N, outputting results of accessed sub-problems.

6. The joint recommendation and cache optimization method according to claim 3, wherein solving the cache sub-problem based on the cache optimization sub-model by using a cache optimization method of an improved greedy algorithm comprises:

step D31, when a global cache variable corresponding to each base station is a zero vector, combining a recommendation policy r, an access policy l, an initial cache policy c, and a number of iterations N for each to-be-responded content request;

step D32 when n=1, $S=F/C \cup C_j$, $C_j=\emptyset$ when $S \neq \emptyset$ then $$f' \leftarrow \underset{f \in S}{\operatorname{argmax}} \frac{T_j(C_j \cup \{f\}) - T_j(C_j)}{L_f},$$

when $$\sum_{f \in C_j \cup \{f'\}} L_f \leq C_j,$$

then $S=S\backslash\{f'\}$, $C_{jf'}=1$, otherwise, $S=S\backslash\{f'\}$;

where $T_j(C_j)$ indicates a total time delay of the system of a set of cached contents $C_j$ in the target base station j, when a global recommendation, the access of the target base station and cache decisions are known.

7. The joint recommendation and cache optimization method according to claim 1, further comprising:

performing an iterative loop, by the access optimization sub-model, the cache optimization sub-model and the recommendation optimization sub-model, based on their corresponding optimization sub-problems and a number of iterations N;

after N iterations, obtaining the target base station, the optimal cache contents and the recommendation list of the to-be-responded content request, and responding to the to-be-responded content request.

\* \* \* \* \*